(12) United States Patent
Tong et al.

(10) Patent No.: US 6,438,820 B1
(45) Date of Patent: Aug. 27, 2002

(54) METHOD OF MINIMIZING ROTOR BODY WINDAGE LOSS

(75) Inventors: Wei Tong, Clifton Park; Brian E. B. Gott, Delanson, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/536,415

(22) Filed: Mar. 28, 2000

Related U.S. Application Data

(62) Division of application No. 09/406,679, filed on Sep. 27, 1999, now abandoned.

(51) Int. Cl.⁷ .............................................. H02K 15/02
(52) U.S. Cl. .............................. 29/598; 29/596; 29/732; 310/214
(58) Field of Search ......................... 29/598, 596, 736, 29/732, 734, 744; 310/214, 254, 42; 242/433

(56) References Cited

U.S. PATENT DOCUMENTS

| | | | | |
|---|---|---|---|---|
| 2,134,795 A | * | 11/1938 | Myers | 171/206 |
| 2,386,673 A | * | 10/1945 | Fisher | 171/252 |
| 3,447,009 A | * | 5/1969 | Keuth et al. | 310/214 |
| 4,163,166 A | | 7/1979 | Kamiya et al. | |
| 4,403,402 A | * | 9/1983 | Tomite et al. | 29/595 |
| 4,413,405 A | * | 11/1983 | Doke et al. | 29/596 |
| 4,425,521 A | * | 1/1984 | Rosemberry, Jr. et al. | 310/214 |
| 4,572,980 A | | 2/1986 | Anderson et al. | |
| 4,584,497 A | | 4/1986 | Butman, Jr. et al. | |
| 4,607,183 A | | 8/1986 | Rieber et al. | |
| 4,704,787 A | * | 11/1987 | Herzog et al. | 29/596 |
| 4,761,580 A | * | 8/1988 | Hein et al. | 310/214 |
| 4,774,429 A | | 9/1988 | Ueda | |
| 5,091,666 A | | 2/1992 | Jarczynski | |
| 5,214,839 A | * | 6/1993 | Rieber et al. | 29/596 |
| 5,421,077 A | * | 6/1995 | Zayechek et al. | 29/598 |
| 5,459,363 A | | 10/1995 | Miyakawa et al. | |
| 5,469,009 A | | 11/1995 | Wakui et al. | |
| 5,654,603 A | * | 8/1997 | Sung et al. | 310/214 |
| 6,288,461 B1 | * | 9/2001 | Mori et al. | 310/58 |

FOREIGN PATENT DOCUMENTS

| | | | | |
|---|---|---|---|---|
| JP | 55153239 | * | 11/1980 | 29/596 |
| JP | 63110937 | * | 5/1988 | 29/596 |

* cited by examiner

*Primary Examiner*—Peter Vo
*Assistant Examiner*—Minh Trinh
(74) *Attorney, Agent, or Firm*—Nixon & Vanderhye P.C.

(57) ABSTRACT

In a rotating electric machine including a rotor and a stator surrounding said rotor in substantially concentric relation therewith to establish a gap therebetween, and wherein the stator is formed with a plurality of radially oriented slots, each slot receiving a stator bar held in place by a wedge, an arrangement to minimize rotor windage loss wherein each wedge substantially fills its respective slot such that an end surface of the wedge is substantially flush with adjacent surfaces of the stator.

5 Claims, 3 Drawing Sheets

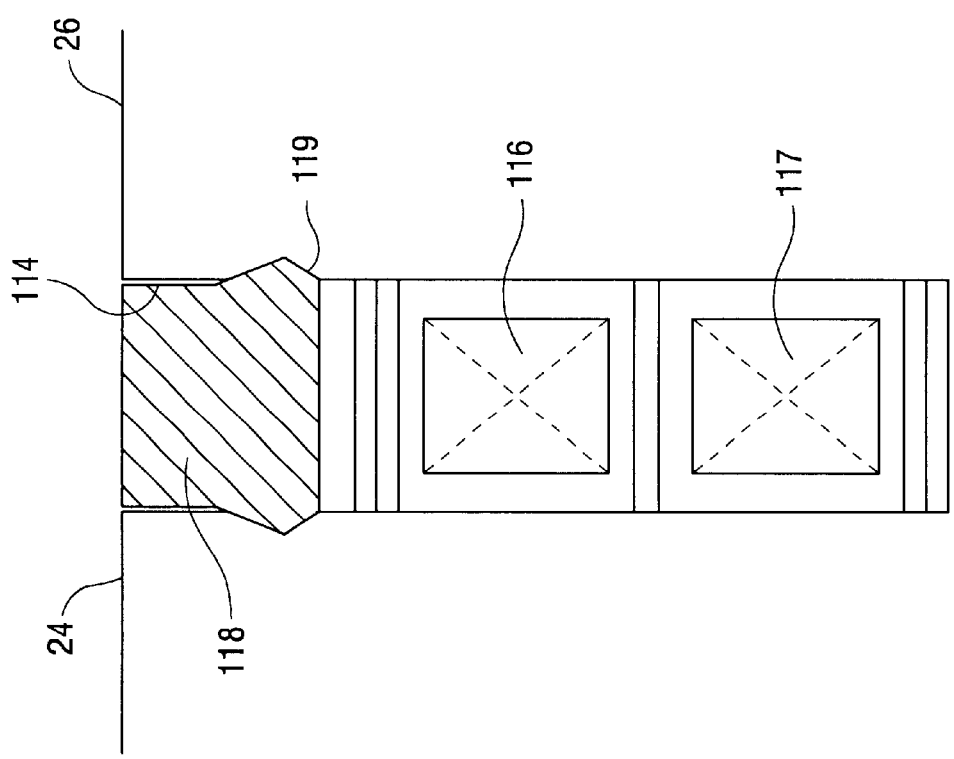
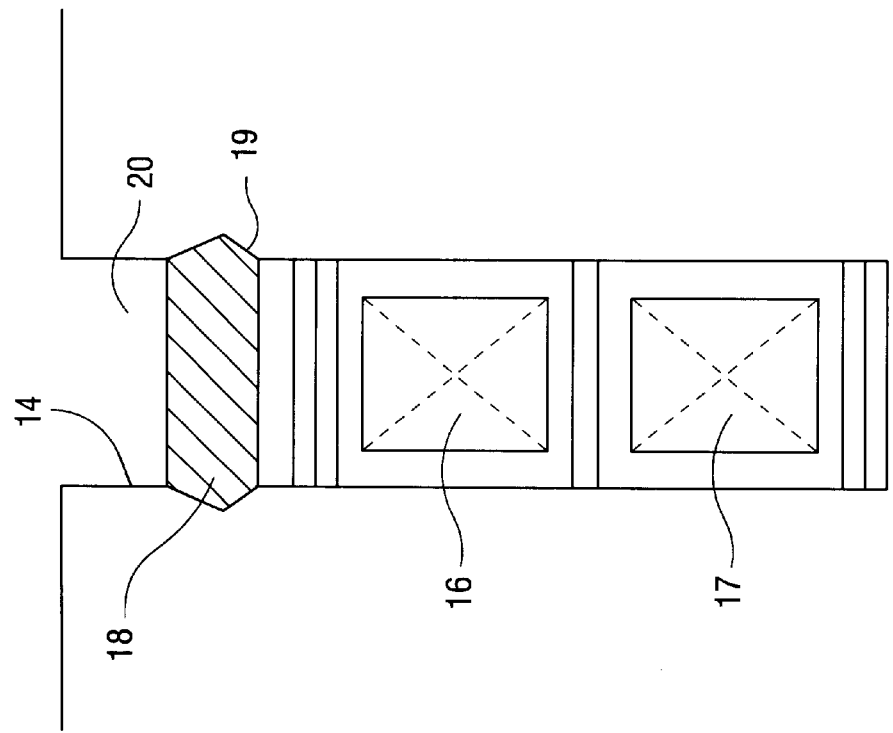

METHOD OF MINIMIZING ROTOR BODY WINDAGE LOSS

This is a divisional of application Ser. No. 09/406,679, filed Sep. 27, 1999, which is abandoned, Nov. 3, 2000 the entire content of which is hereby incorporated by reference in this application.

BACKGROUND OF THE INVENTION

This invention relates to rotary electric machines in general and to stator slot designs in particular. Radially oriented stator slots are used to mount stator bars in a stator frame surrounding a rotor. The stator bars in each slot are secured by a dovetail wedge which sustains forces from the stator bars. A conventional wedge is short in height, leaving the slot partially unfilled near the slot mouth. Due to the existence of such unfilled slots, the rotor body windage loss (or friction factor) on the rotor surface is rather high. Specifically, the rotor rotating-driven flow can penetrate into these unfilled slots so that the flow field in the stator-rotor gap is distorted and the friction factor on the rotor surface is increased significantly. Among various generator windage losses, the rotor body ranks the second largest.

BRIEF SUMMARY OF THE INVENTION

The present invention relates to a reduction in the rotating body windage loss in rotary electric machines such as generators and induction motors.

We have discovered that the most effective way to reduce friction factor (or windage loss) is to redesign the dovetail wedge to fill all of the slot space. In this way, the flow in the air gap is similar to the flow between two concentric smooth cylinders, with the radially inner cylinder rotating. The comparison of friction factor profiles on the rotor surfaces has shown that with the proposed dovetail wedge, the rotor body windage loss can be reduced by about 26%.

In its broader aspects, the invention thus provides a rotating electric machine including a rotor and a stator surrounding the rotor in substantially concentric relation therewith to establish a gap therebetween, and wherein the stator is formed with a plurality of radially oriented slots, each slot receiving a stator bar held in place by a wedge, an arrangement to minimize rotor windage loss wherein each wedge substantially fills its respective slot such that an end surface of the wedge is substantially flush with adjacent surfaces of the stator.

BRIEF DESCRIPTION OF THE DRAWINGS

FIG. 2 is a schematic diagram illustrating a dovetail wedge of conventional construction, similar to that shown in FIG. 1;

FIG. 3 is a schematic diagram illustrating a dovetail wedge design in accordance with an embodiment of this invention.

DETAILED DESCRIPTION OF THE INVENTION

Figure 1:
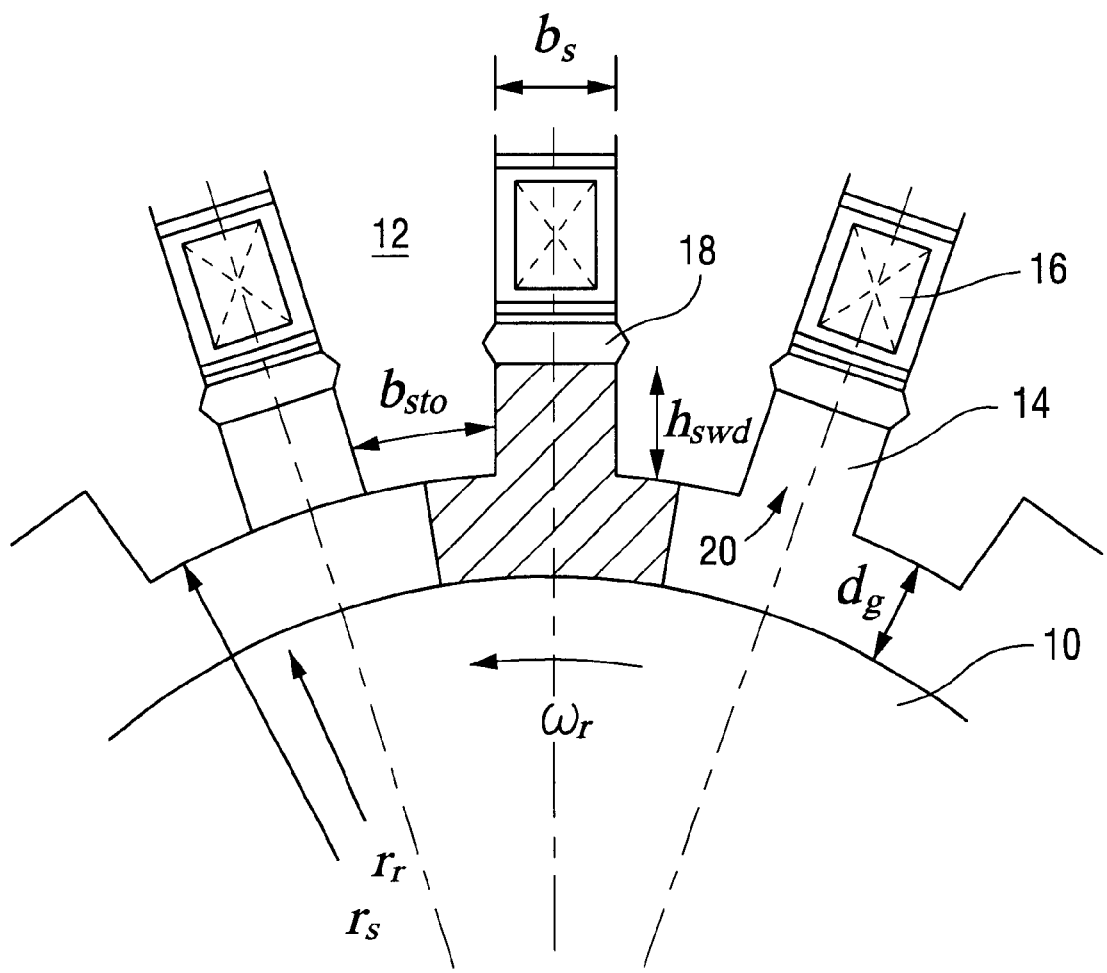
FIG. 1 is a partial schematic diagram illustrating a conventional rotor and surrounding stator slots, bars and wedges.

FIGS. 1 and 2 show a conventional stator/rotor arrangement where the rotor 10 is surrounded by a concentrically located stator 12. The stator is formed with a plurality of radial slots 14 which receive stator bars 16. The latter are held in place by wedges 18 (including dovetails 19). In known arrangements, the wedge design leaves open spaces 20 at the radially innermost locations of each slot. The driven flow generated by the rotor as it rotates penetrates into these open areas and increases windage loss on the rotor surface. FIG. 2 illustrates the high windage loss associated with such stator designs.

With further reference to FIG. 1, the stator-slots distribute uniformly on the stator circumference with slot width $b_s$ where $b_s$ is the measured distance between the two parallel side walls of the slot, and depth $h_{swd}$ where $h_{swd}$ is measured from the slot opening to the wedge 18. The radii of rotor and stator are $r_i$ and $r_s$, respectively. The "tooth width" $b_{s+o}$ is thus determined by:

$$b_{sio} = \frac{2\pi r_s}{n} - b_s$$

where n is the slot number. The rotor rotates with angular velocity $\omega_r$. The induced turbulent flow in the annular gap is assumed to be steady.

Friction factor is defined as the ratio of the shear stress acting on the surface to the dynamic pressure applied on the same surface. For a generator, friction factor is associated with pumping action of a rotor in imparting energy to the cooling medium at the rotor-stator annular gap. An important characteristic of rotor rotating-driven flows is the tendency of fluid with high angular momentum to be flung radially outward. The expression of friction factor (generally) is given as:

$$f = \frac{\tau_0}{\rho \bar{u}_\theta^2 / 2}$$

where $\tau_0$ is evaluated from the gradient of the swirl velocity profile at the rotor surface $$\tau_0 = \mu \left| \frac{\partial u_\theta}{\partial r} \right|_{r=r_0}$$

The windage loss $W_{loss}$ per unit length can be related to friction factor f as:

$$W_{loss}/L = \pi \rho \bar{u}_\Theta^2 r_r^2 f \omega$$

An analysis was performed using a state-of-the-art computational fluid dynamics (CFD) code FLUENT/UNS. A numerical simulation of the rotating flow in the computational domain (see FIG. 1) was conducted to determine the effect of the slot aspect ratio A ($A=h_{swd}/b_s$) on friction factor ratio $f_r/f_{r0}$, where $f_r$ is the friction factor for the rotor, and where $f_{r0}$ is the friction factor for the smooth stator wall, i.e., $h_{swd}=0$. The numerical results are displayed in FIG. 4. It shows that friction factor becomes the minimum when A=0 (i.e., without stator slots). A very small increase in A can result in a steep rise in friction factor. When friction factor reaches its local maximum, it will decrease with the increase in A. For larger aspect ratios $f_r/f_{r0}$ decreases slowly and approaches constant.

Figure 4:
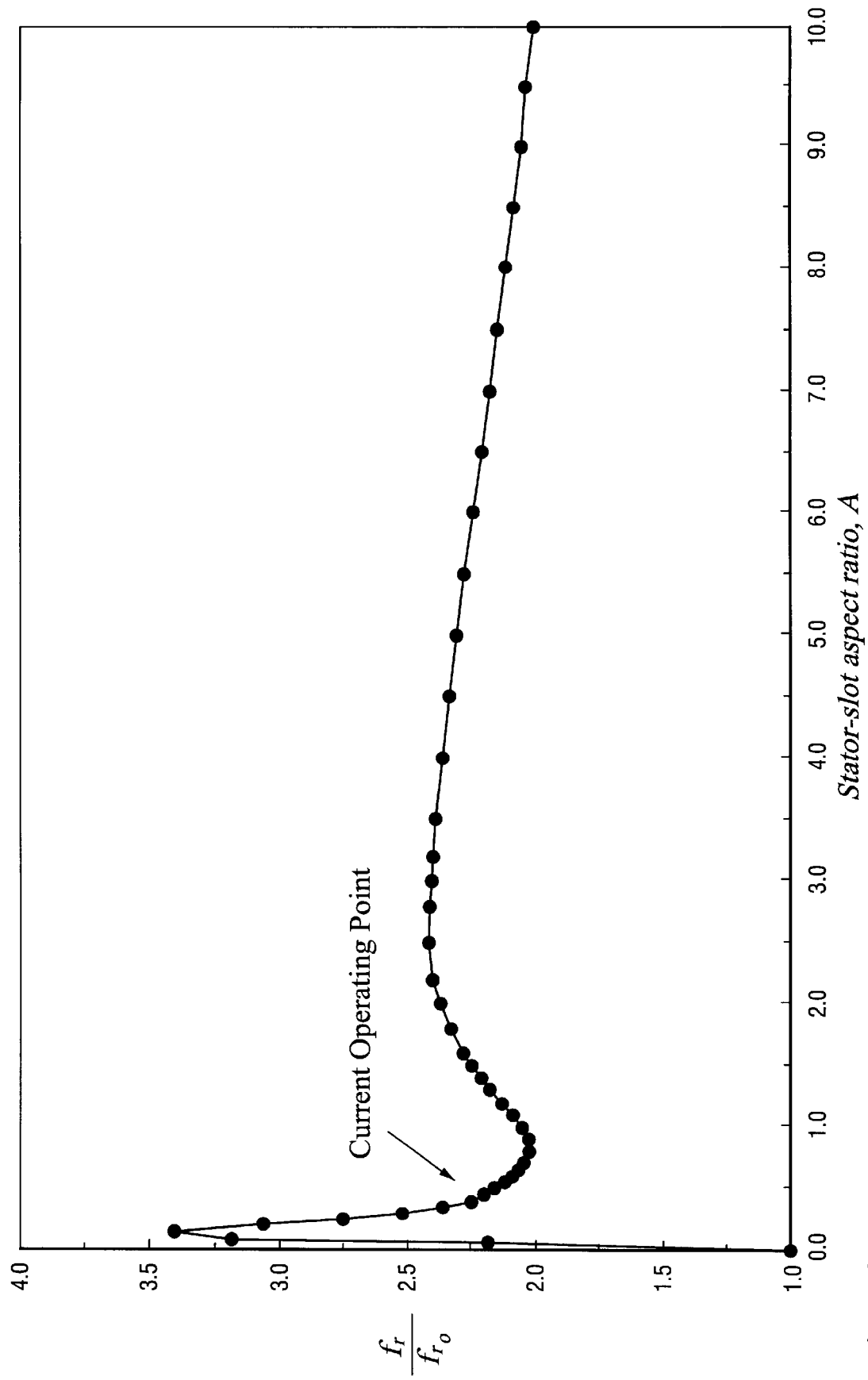
FIG. 4 is a graph illustrating the effect of stator-slot aspect ratio on rotor friction factor ratio.

From FIG. 4 it can be observed that an alternative way to reduce rotor body windage loss is to provide a slot depth such that the aspect ratio A is equal to about 0.80 where friction factor reaches its local minimum. However, the reduction in friction factor in such a way is less than 4%.

Thus, the preferred way to reduce friction factor (or windage loss) is to redesign the dovetail wedge as shown in FIG. 3. The slot 114 receives stator bars 116, 117 and are held in place by the wedge 118 including the dovetail 119. Notice that the wedge 118 completely fills the open area 20 found in prior designs, so that the end 22 of the wedge is substantially flush with the adjacent stator surfaces 24, 26. Thus, the flow in the air gap between the rotor and stator is similar to the flow between two concentric, smooth cylinders, with the inner cylinder rotating. It has been found that the wedge design described herein reduces rotor body windage loss by about 26%.

It will be appreciated that the invention is applicable to all air-cooled and hydrogen cooled generators with either forward or reverse flows.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of reducing rotor body windage loss in a rotary electric machine having a rotor and a stator surrounding said rotor in substantially concentric relationship therewith, and wherein the stator is formed with a plurality of radially oriented slots, each slot defined by a pair of parallel side walls, and having at least one stator bar therein, the method comprising:

a) providing a wedge having a dovetail mounting portion for sliding engagement within said slot at a location radially inward of said stator bar to thereby hold said stator bar in said slot; and b) forming said wedge to leave an unfilled space at a radially innermost end of the slot, the unfilled space having a depth $h_{swd}$ as measured from an entrance to the slot to said wedge, and a width $b_s$ as measured between said pair of parallel side walls, and wherein a slot aspect ratio A as defined by $h_{swd}/b_s$ is equal to about 0.80.

2. The method of claim 1 wherein each of said radially oriented slots receives a pair of said stator bars.

3. The method of claim 1 wherein said wedge includes a dovetail portion adjacent said stator bar.

4. The method of claim 1 wherein said rotary electric machine comprises an air cooled generator.

5. The method of claim 1 wherein said rotary electric machine comprises a hydrogen cooled generator.

* * * * *

UNITED STATES PATENT AND TRADEMARK OFFICE
CERTIFICATE OF CORRECTION

PATENT NO. : 6,438,820 B1
DATED : August 27, 2002
INVENTOR(S) : Tong et al.

It is certified that error appears in the above-identified patent and that said Letters Patent is hereby corrected as shown below:

Title page,
Item [57], ABSTRACT, delete the existing paragraph and insert:
-- A method is provided for reducing rotor body windage loss in a rotary electric machine having a rotor and a stator surrounding the rotor in substantially concentric relationship therewith, and wherein the stator is formed with a plurality of radially oriented slots, each slot having at least one stator bar therein. The method includes a) providing a wedge having a dovetail mounting portion for sliding engagement within the slot at a location radially inward of the stator bar to thereby hold the stator bar in the slot; and b) forming the wedge to leave an unfilled space at a radially innermost end of the slot, the unfilled space having a depth-to-width ratio of about 0.80.--

Column 2,
Line 17, delete the existing formula: " $b_{sio} = \dfrac{2\pi r_s}{n} - b_s$ "

and insert therefor: -- $b_{sto} = \dfrac{2\pi r_s}{n} - b_s$ --

Line 41, delete the existing formula: " $\tau_0 = \mu \left| \dfrac{\hat{c} u_\theta}{\hat{c} r} \right|_{r=r_0}$ "

and insert therefor: -- $\tau_0 = \mu \left| \dfrac{\partial u_\theta}{\partial r} \right|_{r=r_0}$ --

Signed and Sealed this

Twenty-third Day of November, 2004

JON W. DUDAS
*Director of the United States Patent and Trademark Office*